United States Patent
Lee

(10) Patent No.: US 11,618,402 B2
(45) Date of Patent: Apr. 4, 2023

(54) VEHICLE COLLISION DETERMINATION SYSTEM AND METHOD

(71) Applicant: HYUNDAI MOBIS Co., Ltd., Seoul (KR)

(72) Inventor: Choong Ryung Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 78 days.

(21) Appl. No.: 17/168,045

(22) Filed: Feb. 4, 2021

(65) Prior Publication Data

US 2021/0245693 A1   Aug. 12, 2021

(30) Foreign Application Priority Data

Feb. 7, 2020   (KR) .................. 10-2020-0015117
Feb. 7, 2020   (KR) .................. 10-2020-0015118

(51) Int. Cl.
| | | |
|---|---|---|
| B60R 21/36 | (2011.01) | |
| B60R 21/0136 | (2006.01) | |
| B60R 21/0132 | (2006.01) | |
| B60R 19/48 | (2006.01) | |
| B60R 21/34 | (2011.01) | |
| B62D 25/10 | (2006.01) | |

(52) U.S. Cl.
CPC ........ *B60R 21/0136* (2013.01); *B60R 19/483* (2013.01); *B60R 21/0132* (2013.01); *B60R 21/34* (2013.01)

(58) Field of Classification Search
CPC ......... B60R 21/36; B60R 21/34; B60R 21/16; B62D 25/10
See application file for complete search history.

(56) References Cited

U.S. PATENT DOCUMENTS

| | | | | |
|---|---|---|---|---|
| 7,734,393 B2* | 6/2010 | Murakami | .......... | B60R 21/0136 |
| | | | | 293/121 |
| 7,737,833 B2* | 6/2010 | Takafuji | .................. | B60R 21/34 |
| | | | | 180/274 |
| 2006/0224289 A1* | 10/2006 | Kiribayashi | ............ | B60R 21/34 |
| | | | | 701/45 |

(Continued)

FOREIGN PATENT DOCUMENTS

| | | |
|---|---|---|
| DE | 102006014055 | 10/2006 |
| DE | 102005036954 | 2/2007 |

(Continued)

OTHER PUBLICATIONS

Office Action dated Apr. 5, 2022 from the Japanese Patent Office for German patent application No. 10 2021 102 733.0.

*Primary Examiner* — Tan Q Nguyen
(74) *Attorney, Agent, or Firm* — H.C. Park & Associates, PLC

(57) ABSTRACT

A vehicle collision determination system includes an acceleration sensor fixedly positioned to a front end of the vehicle and configured to measure acceleration at a fixed position, a detector configured to detect whether the vehicle collides using the acceleration measured by the acceleration sensor, a metrics setting unit configured to set at least one metric using the acceleration measured by the acceleration sensor when the detector detects collision of the vehicle, and a determiner configured to determine whether an object that has collided with the vehicle is a pedestrian using the at least one metric set by the metrics setting unit.

17 Claims, 10 Drawing Sheets

(56) References Cited

U.S. PATENT DOCUMENTS

| | | | | |
|---|---|---|---|---|
| 2011/0282538 | A1* | 11/2011 | Tamura | B60R 21/38 |
| | | | | 180/69.21 |
| 2016/0039378 | A1* | 2/2016 | Foo | B60R 21/0136 |
| | | | | 701/45 |
| 2016/0152208 | A1* | 6/2016 | Ewert | B60R 21/34 |
| | | | | 701/46 |
| 2016/0200275 | A1* | 7/2016 | Le Merrer | B60R 21/36 |
| | | | | 180/274 |

FOREIGN PATENT DOCUMENTS

| | | |
|---|---|---|
| DE | 102005055745 | 5/2007 |
| DE | 102005013594 | 12/2007 |
| DE | 102006040654 | 3/2008 |
| DE | 102007048988 | 6/2008 |
| DE | 102008013815 | 9/2008 |
| DE | 102008013546 | 12/2008 |
| DE | 102008031672 | 1/2009 |
| DE | 102009040365 | 4/2010 |
| KR | 102048938 | 11/2019 |

* cited by examiner

VEHICLE COLLISION DETERMINATION SYSTEM AND METHOD

CROSS-REFERENCE TO THE RELATED APPLICATION

This application claims priority from and the benefit of Korean Patent Application Nos. 10-2020-0015117, filed on Feb. 7, 2020 and 10-2020-0015118 filed on Feb. 7, 2020, which are hereby incorporated by reference for all purposes as if set forth herein.

BACKGROUND OF THE INVENTION

Field

One or more embodiments relate to a vehicle impact determination system and method, and more particularly to a technology for determining whether impact applied to the vehicle corresponds to collision with a pedestrian.

Discussion of the Background

Recently, as pedestrian protection in vehicle accidents has been regulated, performance for protecting pedestrians in the case of collision with pedestrians has drawn attention as a safety class indicator for vehicle hoods.

As an engine of a vehicle becomes larger and simultaneously installations inside an engine compartment become more compact, there is a problem in that performance for protecting pedestrians is degraded due to reduction in a space under a vehicle hood required for pedestrian protection.

To solve this problem, a device such as a hood lift for lifting a pedestrian airbag or a vehicle hood for pedestrian protection and technologies for controlling an operation of the device have been developed.

Conventionally, a pedestrian protection device is operated by determining collision with a pedestrian based on specific metrics using a detection signal detected by a collision sensor. However, according to such technologies, there is a problem in that a pedestrian protection device malfunctions with respect to collision for a similar effective mass to a pedestrian or is malfunctioned or does not work depending on a location of collision.

In addition, the time at which a width of an object is detected from the detection signal is delayed based on a required time to deployment of the pedestrian protection device, and thus there is a possibility that an operation of the device is delayed.

The above information disclosed in this Background section is only for enhancement of understanding of the background of the invention and, therefore, it may contain information that does not constitute prior art.

SUMMARY OF THE INVENTION

One or more embodiments of the inventive concepts have been made in view of the above problems, and these embodiments provide a technology for operating a pedestrian protection device for accurately and rapidly detecting collision with a pedestrian when detecting impact of the vehicle.

In accordance with an aspect, a vehicle collision determination system includes an acceleration sensor fixedly positioned to a front end of the vehicle and configured to measure acceleration at a fixed position, a detector configured to detect whether the vehicle collides using the acceleration measured by the acceleration sensor, a metrics setting unit configured to set at least on metric using the acceleration measured by the acceleration sensor when the detector detects collision of the vehicle, and a determiner configured to determine whether an object that has collided with the vehicle is a pedestrian using the at least one metric set by the metrics setting unit.

The acceleration sensor may be fixed to a front bumper positioned at a forefront side of the vehicle.

The metrics setting unit may set an accumulated acceleration value obtained by accumulating an acceleration magnitude or an acceleration variation magnitude of acceleration measured by the acceleration sensor in a preset first number and a double accumulated acceleration value obtained by accumulating an accumulated acceleration value in a preset second number, to metrics, and the determiner may determine that the object colliding with the vehicle is a pedestrian when an accumulated acceleration value change compared with the double accumulated acceleration value is greater than a preset lowest range based on the set metrics and is maintained less than a preset highest range.

The metrics setting unit may apply a high pass filter for passing only a higher frequency signal than a preset first frequency to the acceleration measured by the acceleration sensor and may set the metrics using the acceleration to which the high pass filter is applied.

The acceleration sensor may include a left sensor positioned at a left side of the vehicle, a right sensor positioned at a right side of the vehicle, and a central sensor positioned at a central side of the vehicle, and the metrics setting unit may set left metrics by summing metrics set using acceleration measured by the left sensor and the central sensor, may set right metrics by summing metrics set using acceleration measured by the right sensor and the central sensor, and may set summing metrics by summing metrics set using acceleration measured by the left sensor, the right sensor, and the central sensor.

The determiner may determine that the object is a pedestrian when the object determined using the summing metrics is a pedestrian and the object determined by at least one of the left metrics and the right metrics is a pedestrian.

The vehicle collision determination system may further include an impact sensor positioned at the front end of the vehicle at rear and upper sides of the acceleration sensor and configured to measure impact externally applied to the vehicle, wherein the metrics setting unit may set an accumulated acceleration value obtained by accumulating an acceleration magnitude or an acceleration variation magnitude of acceleration measured by the acceleration sensor in a preset first number, to acceleration metrics, and may set a double accumulated signal value obtained by re-accumulating an accumulated signal value, which is obtained by accumulating a signal measured by the impact sensor or a variation in the signal for a preset time in a preset third number, in a preset fourth number, to impact metrics.

The vehicle collision determination system may further include a speed sensor configured to measure a driving speed of the vehicle or a rotation speed of a wheel, an impact reduction device configured to reduce impact of a pedestrian that collides with the vehicle, and an operating unit configured to set a required time to engage the impact reduction device based on the driving speed of the vehicle or the rotation speed of the wheel, measured by the speed sensor, and to operate the impact reduction device when a time at which the detector detects collision with the vehicle exceeds the set required time to engage.

In accordance with another aspect, a vehicle collision determination system includes a pressure sensor positioned at a front end of the vehicle and configured to measure external force applied to the front end of the vehicle, a detector configured to detect whether the vehicle collides using the external force measured by the pressure sensor, a metrics setting unit configured to set at least one metric using the external force measured by the pressure sensor when the detector detects collision of the vehicle, and a determiner configured to determine whether an object that has collided with the vehicle is a pedestrian using the at least one metric set by the metrics setting unit.

The vehicle collision determination system may further include a fluid pipe extending in a width direction of the vehicle and configured to store a fluid therein, wherein the pressure sensor may sense a pressure of the fluid inside the fluid pipe.

The metrics setting unit may set the external force measured by the pressure sensor and an accumulated value of external force obtained by accumulating the measured external force in a preset first number to external force metrics, and the determiner may determine that the object that has collided with the vehicle is a pedestrian when a change in the external force compared with the accumulated value of external force is greater than a preset lowest range based on the set external force metrics and is maintained less than a preset highest range.

A low pass filter for passing only a lower frequency signal than a preset second frequency may be applied to the external force measured by the pressure sensor, and external force metrics may be set using the external force to which the low pass filter is applied.

The vehicle collision determination system may further include an impact sensor positioned at the front end of the vehicle at rear and upper sides of the fluid pipe and configured to measure an impact externally applied to the vehicle, wherein the metrics setting unit may set an accumulated value of external force obtained by accumulating the external force measured by the pressure sensor in a preset first number, to external force metrics, and may set a double accumulated acceleration value obtained by re-accumulating an accumulated acceleration value, which is obtained by accumulating an acceleration magnitude of acceleration measured by the acceleration sensor or an acceleration variation magnitude of the acceleration for a preset time in a preset second number, in a preset third number, to impact metrics.

The metrics setting unit may apply a high pass filter for passing only a higher frequency signal than a preset first frequency to the acceleration measured by the impact sensor and may set the impact metrics using the acceleration to which the high pass filter is applied.

The vehicle collision determination system may further include a speed sensor configured to measure a driving speed of the vehicle or a rotation speed of a wheel, an impact reduction device configured to reduce impact of a pedestrian that collides with the vehicle, and an operating unit configured to set a required time to engage the impact reduction device based on the driving speed of the vehicle or the rotation speed of the wheel, measured by the speed sensor, and to operate the impact reduction device when the time at which the detector detects collision with the vehicle exceeds the set required time to engage.

The pressure sensor may be configured in plural and the plurality of pressure sensors are positioned at a left side and a right side of the vehicle, the metrics setting unit may set left metrics using external force measured by a pressures sensor positioned at a left side, may set right metrics using external force measured by a pressure sensor positioned at a right side, and may set summing metrics using resultant force obtained by summing the external force measured by the left sensor positioned at the left side and the external force measured by the right sensor positioned at the right side, and the determiner may determine that the object is a pedestrian when the object determined using the summing metrics is a pedestrian and the object determined by at least one of the left metrics and the right metrics is a pedestrian.

In accordance with another aspect, a vehicle collision determination method includes measuring acceleration at a fixed position or external force applied to a front end of the vehicle by an acceleration sensor or a pressure sensor positioned at the front end of the vehicle, detecting whether the vehicle collides using the measured acceleration or external force, when detecting collision, setting at least one metric using the measured acceleration or external force, and determining whether an object has collided with the vehicle is a pedestrian using the set at least one metric.

The vehicle collision determination method may further include, prior to the setting the metrics, measuring an impact externally applied to the vehicle using an impact sensor positioned at a front end of the vehicle at rear and upper sides of the acceleration sensor or the pressure sensor, wherein the setting of the metrics may include setting acceleration metrics using the acceleration measured by the acceleration sensor or setting external force metrics using the external force measured by the pressure sensor, and setting impact metrics using a signal measured by the impact sensor, and the determining whether the object is a pedestrian may include determining that the object is the pedestrian when both results respectively determined using the acceleration metrics or the external force metrics and the impact metrics correspond to a pedestrian and the object determined by simultaneously using the acceleration metrics or the external force metrics and the impact metrics is a pedestrian.

The vehicle collision determination method may further include, after the determining whether the object is a pedestrian, setting a required time to engage of an impact reduction device based on a driving speed of the vehicle or a rotation speed of a wheel and operating the impact reduction device when a time at which collision of the vehicle is detected exceeds the set required time to engage.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE PREFERRED EMBODIMENTS

Figure 1:
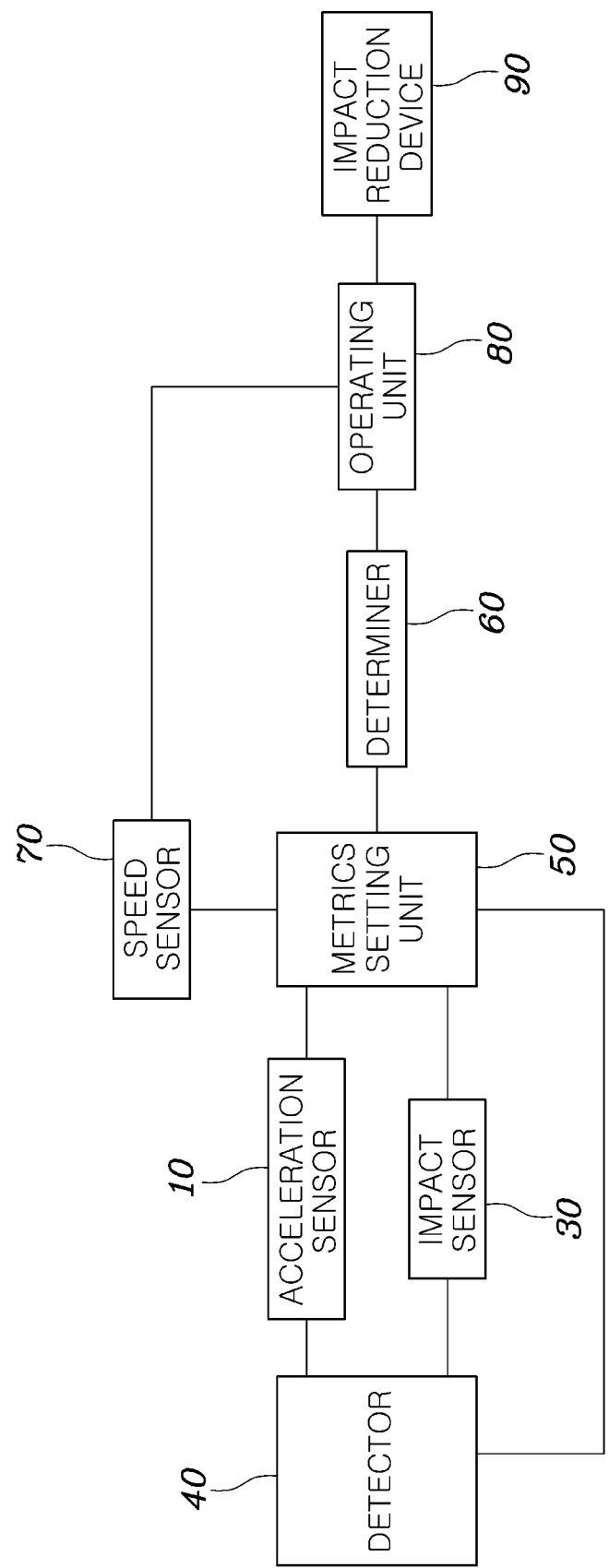
FIG. 1 is a diagram showing the configuration of a vehicle collision determination system according to an embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

In embodiments of the present disclosure described herein, specific structural and functional descriptions are merely illustrated for the purpose of illustrating embodiments of the present disclosure and the embodiments described herein may be embodied in many forms and are not limited to the embodiments set forth herein.

Embodiments can be variously changed and embodied in various forms, in which illustrative are shown. However, these embodiments should not be construed as being limited to the descriptions as set forth herein and any changes, equivalents or alternatives which are within the spirit and scope of the present disclosure should be understood as falling within the scope of these embodiments.

It will be understood that although the terms first, second, etc. may be used herein to describe various elements, these elements should not be limited by these terms. These terms are only used to distinguish one element from another element. For example, a first element may be termed a second element and a second element may be termed a first element without departing from the teachings as set forth herein.

It will be understood that when an element is referred to as being "connected to" or "coupled to" another element, it may be directly connected or coupled to the other element or intervening elements may be present. In contrast, when an element is referred to as being "directly connected to" or "directly coupled to" another element, there are no intervening elements or layers present. Other words used to describe the relationship between elements or layers should be interpreted in a like fashion, e.g., "between," versus "directly between," "adjacent," versus "directly adjacent," etc.

The terms used herein are used for explaining a specific embodiment, and not for limiting the embodiment. Thus, the singular expressions in the present specification include the plural expressions unless clearly specified otherwise in context. Also, terms such as "include" or "comprise" may be construed to denote a certain characteristic, number, step, operation, constituent element, or combination thereof, but may not be construed to exclude the existence of or possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which these embodiments pertain. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to the embodiments, examples of which are illustrated in the accompanying drawings.

Figure 2:
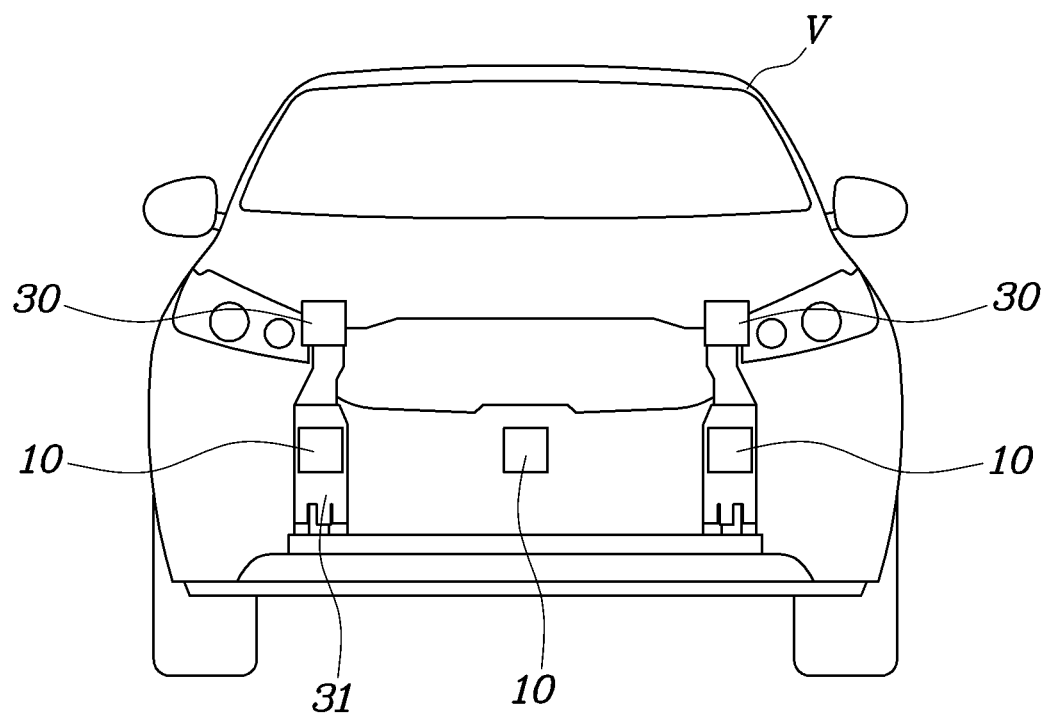
FIGS. 2, 3, and 4 are diagrams showing a vehicle including an acceleration sensor 10 and a collision sensor according to an embodiment.
Figure 3:
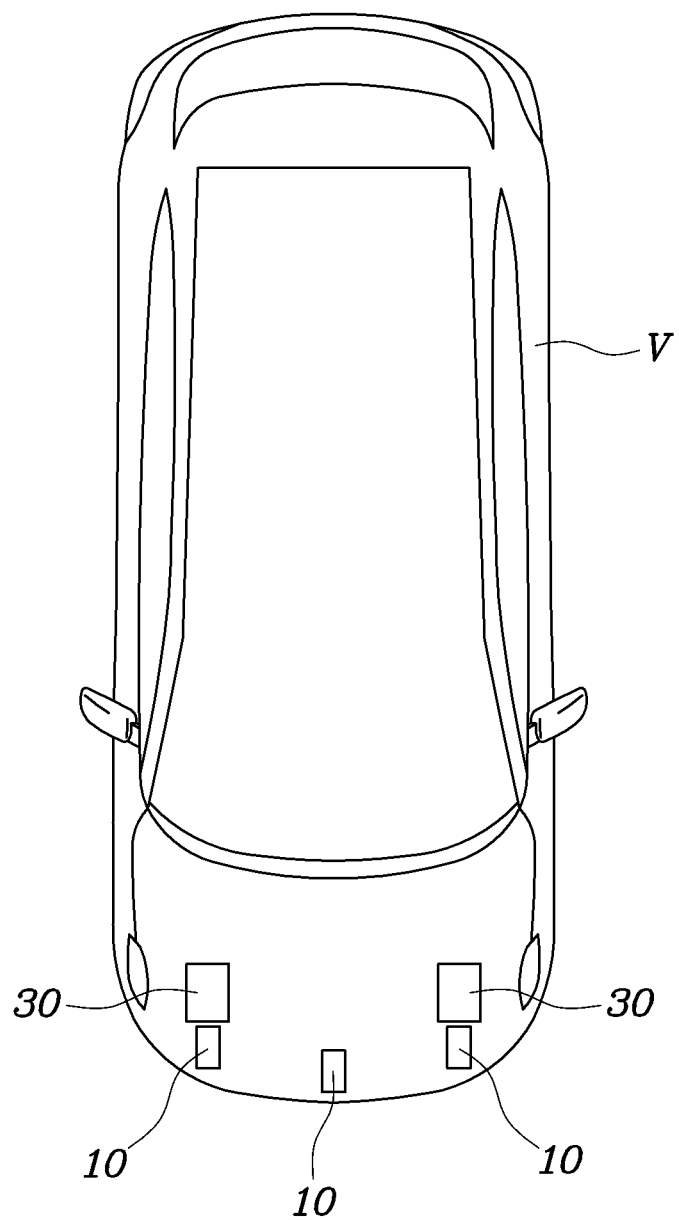
Figure 4:
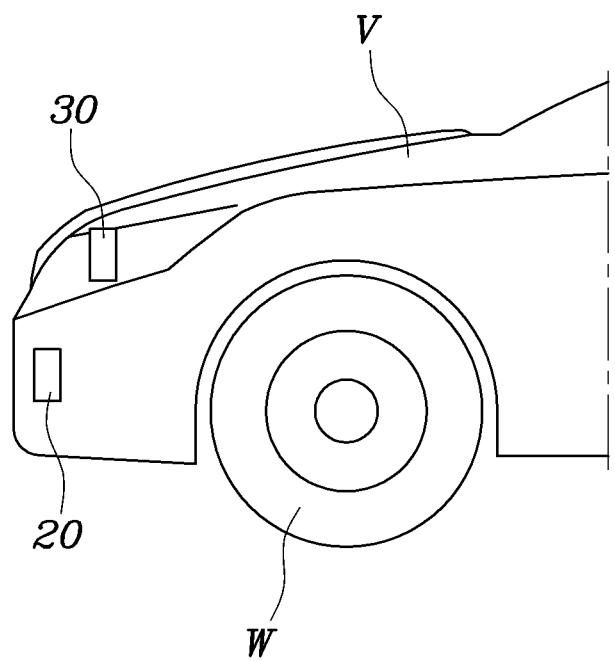

FIG. 1 is a diagram showing the configuration of a vehicle collision determination system according to an embodiment. FIGS. 2 to 4 are diagrams showing a vehicle including an acceleration sensor 10 and a collision sensor according to an embodiment.

Referring to FIGS. 1 to 4, the vehicle collision determination system according to an embodiment may include the acceleration sensor 10 that is fixedly positioned to a front end of a vehicle and measures acceleration at the fixed position, a detector 40 for detecting whether a vehicle collides using the acceleration measured by the acceleration sensor 10, a metrics setting unit 50 for setting at least one metric using the acceleration measured by the acceleration sensor 10 when the detector 40 detects collision of the vehicle, and a determiner 60 for determining whether an object colliding with the vehicle is a pedestrian using the at least one metric set by the metrics setting unit 50.

A front bumper of a vehicle may be positioned at the forefront side of the vehicle. A bumper may be formed by a back beam, an impact absorber surrounding the back beam, and a cover externally surrounding the impact absorber.

The acceleration sensor 10 may be fixed to the front bumper located at the forefront of the vehicle. In particular, the acceleration sensor 10 may be fixed to the back positioned inside the bumper. Thus, noise input to the acceleration sensor 10 from the outside may be reduced.

The acceleration sensor 10 may be configured in plural, and the plurality of acceleration sensors 10 may be spaced apart from each other in a width direction of the vehicle and may measure acceleration at different positions in the width direction of the vehicle.

According to an embodiment, the acceleration sensors 10 may be positioned at left, right, and central sides of the vehicle, respectively, and may measure acceleration at various positions in the width direction of the vehicle.

The detector 40 may detect whether the vehicle collides using the acceleration measured by the acceleration sensors 10. In particular, when an acceleration($\alpha$) measured by the acceleration sensor 10 or an accumulated amount of acceleration $MS(\alpha)$ is equal to or greater than a preset value, the detector 40 may detect that the vehicle collides. In particular, when an acceleration magnitude $|\alpha|$ or an accumulated amount of acceleration magnitude $MS(|\alpha|)$ is equal to or greater than a preset value, the detector 40 may detect that the vehicle collides.

When impact measured by an impact sensor 30 is equal to or greater than a predetermined impact, the detector 40 may detect that the vehicle collides as described below.

When the acceleration magnitude or the acceleration variation magnitude of acceleration measured by the acceleration sensor 10 is equal to or greater than a preset value or the impact measured by the impact sensor 30 is equal to or greater than a preset impact, the detector 40 may detect that the vehicle collides (OR condition).

When the acceleration sensor 10 or the impact sensor 30 is configured in plural, if an accumulated amount of acceleration or impact measured by at least one sensor is equal to or greater than a preset magnitude or is equal to or greater than a preset reference impact, the detector 40 may detect that the vehicle collides.

When the detector 40 detects that the vehicle collides, the metrics setting unit 50 may set metrics for identifying an object. In particular, the metrics setting unit 50 may set metrics using the acceleration measured by the acceleration sensor 10.

In detail, when the acceleration magnitude $|\alpha|$ of the acceleration measured by the acceleration sensor 10 or the accumulated amount of acceleration magnitude $MS(|\alpha|)$ is equal to or greater than a preset value, the detector 40 may detect that the vehicle collides and may set metrics for identifying an object.

According to another embodiment, when any one of various sensors determines that the vehicle collides, the detector 40 may set metrics for identifying an object. Here, a threshold for detecting collision of the vehicle may be preset to different values depending on the type, position, or the like of the sensor.

The determiner 60 may determine whether the object that collides with the vehicle is a pedestrian using the metrics set by the metrics setting unit 50. According to an embodiment, whether the object that collides with the vehicle is a pedestrian may be determined by determining whether the set metrics enter a preset range.

Figure 5:
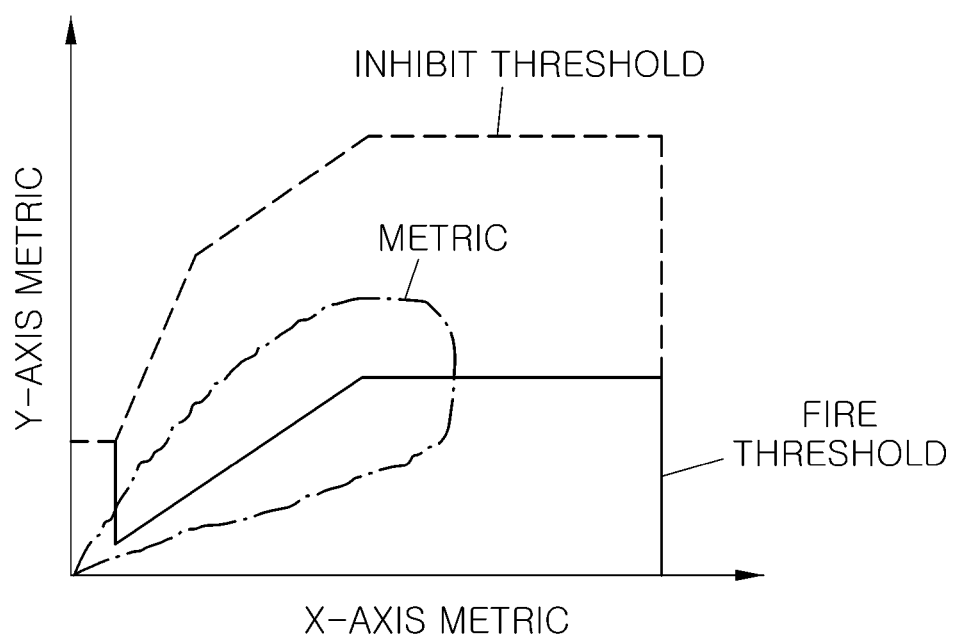
FIG. 5 shows metrics in the X-Y coordinate system according to an embodiment.

FIG. 5 shows metrics in the X-Y coordinate system according to an embodiment.

Further referring to FIG. 5, the metrics setting unit 50 may set an accumulated acceleration value $MS(|\Delta\alpha|)$ obtained by accumulating, to metric, the acceleration magnitude $|\alpha|$ of acceleration measured by the acceleration sensor 10 or the acceleration variation magnitude $|\Delta a|$ of the acceleration in a preset first number and a double accumulated acceleration value $MS(MS(|\Delta a|))$ obtained by accumulating the accumulated acceleration value in a preset second number.

In detail, the accumulated acceleration value $MS(51\ \Delta\alpha|)$ obtained by accumulating the acceleration magnitude $|\alpha|$ of the acceleration measured by the acceleration sensor 10 or the acceleration variation magnitude $|\Delta a|$ of the acceleration in the preset first number through moving sum calculation and the double accumulated acceleration value $MS(MS(|\Delta a|))$ obtained by accumulating the accumulated acceleration value in a preset second number may be set to the metrics.

Here, the first number and the second number may be appropriately set in consideration of a measurement cycle or required time to engage a sensor and may be set to the same value.

In particular, the accumulated acceleration value $MS(|\Delta a|)$ obtained by accumulating an absolute value applied to an acceleration variation $\Delta a$ in the preset first number may be set to the metrics, and the double accumulated acceleration value $MS(MS(|\Delta a|))$ obtained by re-accumulating the accumulated acceleration value in the preset second number may be set to the metrics.

In particular, the metrics setting unit 50 may apply a high pass filter for passing only a higher frequency signal than a preset first frequency to the acceleration measured by the acceleration sensor 10 and may set metrics using the acceleration which the high pass filter is applied.

Here, the preset first frequency (cut off frequency) may be set to, for example, 300 Hz. Thus, noise that is mainly generated in a low-frequency region may be removed, and a change in a measured value of the acceleration sensor 10, which occurs due to collision between a vehicle and an object, may be accurately determined.

As shown in FIG. 5, according to an embodiment, the double accumulated acceleration value $MS(MS(|\Delta a_{HPF}|))$ may be set to X-axis metrics, and the accumulated acceleration value $MS(|\Delta a_{HPF}|)$ may be set to Y-axis metrics.

When an accumulated acceleration value change compared with the double accumulated acceleration value is greater than a preset lowest range based on the set metrics and is maintained less than a preset highest range, the determiner 60 may determine that the object that has collided with the vehicle is a pedestrian.

In particular, the determiner 60 may derive a plot having the double accumulated acceleration value $MS(MS(|\Delta a_{HPF}|))$ on the X axis and the accumulated acceleration value $MS(|\Delta a_{HPF}|)$ on the Y axis, and when the derived plot is not greater than the preset lowest range or is greater than the preset highest range, the determiner 60 may determine that the object that has collided with the vehicle is not a pedestrian.

In detail, the preset lowest range may be set to a reference than which the plot needs to be greater even in an unfavorable condition when a vehicle collides with a pedestrian, and the determiner 60 may determine that the object that has collided with the vehicle is a pedestrian when the plot is greater than the preset lowest range at least in a partial section.

In addition, the preset highest range may be set to a reference than which the plot is not capable of being greater when the vehicle collides with a pedestrian, and the determiner 60 may determine that the object that has collided with the vehicle is not a pedestrian when the plot is greater than the preset highest range at least in a partial section, and the determiner 60 may determine that the object that has collided with the vehicle is a pedestrian when the plot is maintained not to be greater than the preset highest range.

That is, whether the object that has collided with the vehicle is a pedestrian may be determined through vibration generated in the vehicle by applying metrics using the acceleration sensor 10.

The metrics setting unit 50 may set left metrics (LH+MID) by summing metrics set using acceleration measured by a left sensor and a central sensor, may set right metrics (RH+MID) by summing metrics set using acceleration measured by a right sensor and the central sensor, and may set summing metrics (LH+RH+MID) by summing metrics set using acceleration measured by the left sensor, the right sensor, and the central sensor.

The left metrics (LH+MID) may be set by summing the accumulated acceleration amount $MS(|\Delta a_{HPF}|)$ obtained by accumulating and summing variations in acceleration measured by the left sensor and the central sensor or the double accumulated acceleration value $MS(MS(|\Delta a_{HPF}|))$ obtained by re-accumulating and summing the accumulated acceleration amount.

The right metrics (RH+MID) may be set by summing the accumulated acceleration amount $MS(|\Delta a_{HPF}|)$ obtained by accumulating and summing variations in acceleration measured by the right sensor and the central sensor or the double accumulated acceleration value $MS(MS(|\Delta a_{HPF}|))$ obtained by re-accumulating and summing the accumulated acceleration amount.

The summing metrics (LH+RH+MID) may be set by summing the accumulated acceleration amount $MS(|\Delta a_{HPF}|)$ obtained by accumulating and summing variations in acceleration measured by the left sensor, the right sensor, and the central sensor or the double accumulated acceleration value $MS(MS(|\Delta a_{HPF}|))$ obtained by re-accumulating and summing the accumulated acceleration amount.

The amplitude of a collision signal measured by the acceleration sensor 10 may be changed depending on a location of collision even in the same collision condition. In particular, this is because transmitted vibration energy is reduced away from a location of collision. Accordingly, metrics of two adjacent sensors may be summed in order to reduce collision energy sensitivity based on a location of collision.

The determiner 60 may determine that the object is a pedestrian when the object determined using the summing metrics (LH+RH+MID) is a pedestrian and the object determined by at least one of the left metrics (LH+MID) and the right metrics (RH+MID) is a pedestrian.

That is, the determiner 60 may determine that the object is a pedestrian when the object determined using the left metrics (LH+MID) and the summing metrics (LH+RH+MID) is a pedestrian or the object determined using the right metrics (RH+MID) and the summing metrics (LH+RH+MID) is a pedestrian.

On the other hand, the determiner 60 may determine that the object that has collided with the vehicle is not a pedestrian when even any one of the left metrics (LH+MID), the right metrics (RH+MID), and the summing metrics (LH+RH+MID) is greater than the preset highest range.

The vehicle collision determination system may further include the impact sensor 30 positioned at the front end of the vehicle at rear and upper sides of the acceleration sensor 10 and for measuring an impact externally applied to the vehicle.

The impact sensor 30 may be a front impact sensor (FIS) fixed to a front end module (FEM). The impact sensor 30 may be positioned above the acceleration sensor 10 while being positioned behind the acceleration sensor 10 and may be positioned above a radiator grill positioned at the front end of the vehicle.

That is, the impact sensor 30 may be positioned at an inward side based on the acceleration sensor 10 in the vehicle. The impact sensor 30 may be an accelerometer sensor for measuring acceleration.

The metrics setting unit 50 may set the accumulated acceleration value $MS(|\Delta a_{HPF}|)$ obtained by accumulating the acceleration measured by the acceleration sensor 10 or a variation in the acceleration in a preset first number to the acceleration metrics, and may set to the impact metric, the double accumulated signal value $MS(MS(|\Delta a_{HPF}|))$ obtained by re-accumulating an accumulated signal value, which is obtained by accumulating a signal measured by the impact sensor 30 or a variation in the signal for a preset time in a preset third number, in a preset fourth number.

Here, the signal measured by the impact sensor 30 may be acceleration. In addition, the first number, the second number, the third number, and the fourth number may be appropriately set in consideration of a measurement cycle or a required time to engage a sensor and may be set to the same value.

The impact metrics may be set to the double accumulated value $MS(MS(|\Delta a_{HPF}|))$ obtained by doubly accumulating a variation in acceleration. In particular, the variation in acceleration may be calculated using an absolute value $|\Delta a|$. Here, the preset time may be a measurement cycle for measuring acceleration.

The metrics setting unit 50 may set, to the impact metrics, the double accumulated value $MS(MS(|\Delta a_{HPF}|))$ obtained by re-accumulating the accumulated acceleration value $MS(|\Delta a_{HPF}|)$, which is obtained by accumulating a variation in acceleration in a preset second number, in a third number.

The metrics setting unit 50 may apply a high pass filter for passing only a higher frequency signal than a preset first frequency to the acceleration measured by the acceleration sensor 10 or the impact sensor 30 and may set the acceleration metrics or the impact metrics using the acceleration $a_{HPF}$ to which the high pass filter is applied. Here, the preset first frequency may be set to 300 Hz.

In addition, the metrics setting unit 50 may receive acceleration to which a filter itself of the acceleration sensor 10 or the impact sensor 30 is applied before the high pass filter is applied.

The metrics setting unit 50 may apply a scaling factor to the acceleration received by the acceleration sensor 10 or the impact sensor 30. The scaling factor may be generated based on a driving speed of the vehicle or a rotation speed of a wheel, received by a speed sensor 70 that will be described below.

As shown in FIG. 5, according to an embodiment, the double accumulated signal value $MS(MS(|\Delta a_{HPF}|))$ of a signal measured by the impact sensor 30 may be set to the X-axis metrics, and the accumulated acceleration value $MS(|\Delta a_{HPF}|)$ may be set to the Y-axis metrics.

When an accumulated acceleration value change compared with the double accumulated signal value is greater than a preset lowest range based on the set acceleration metrics and the set impact metrics and is maintained less than a preset highest range, the determiner 60 may determine that the object that has collided with the vehicle is a pedestrian.

In particular, the determiner 60 may derive a plot having the double accumulated signal value $MS(MS(|\Delta a_{HPF}|))$ on the X axis and the accumulated acceleration value $MS(|\Delta a_{HPF}|)$ on the Y axis, and when the derived plot is not greater than the preset lowest range or is greater than the preset highest range, the determiner 60 may determine that the object that has collided with the vehicle is not a pedestrian.

Figure 6:
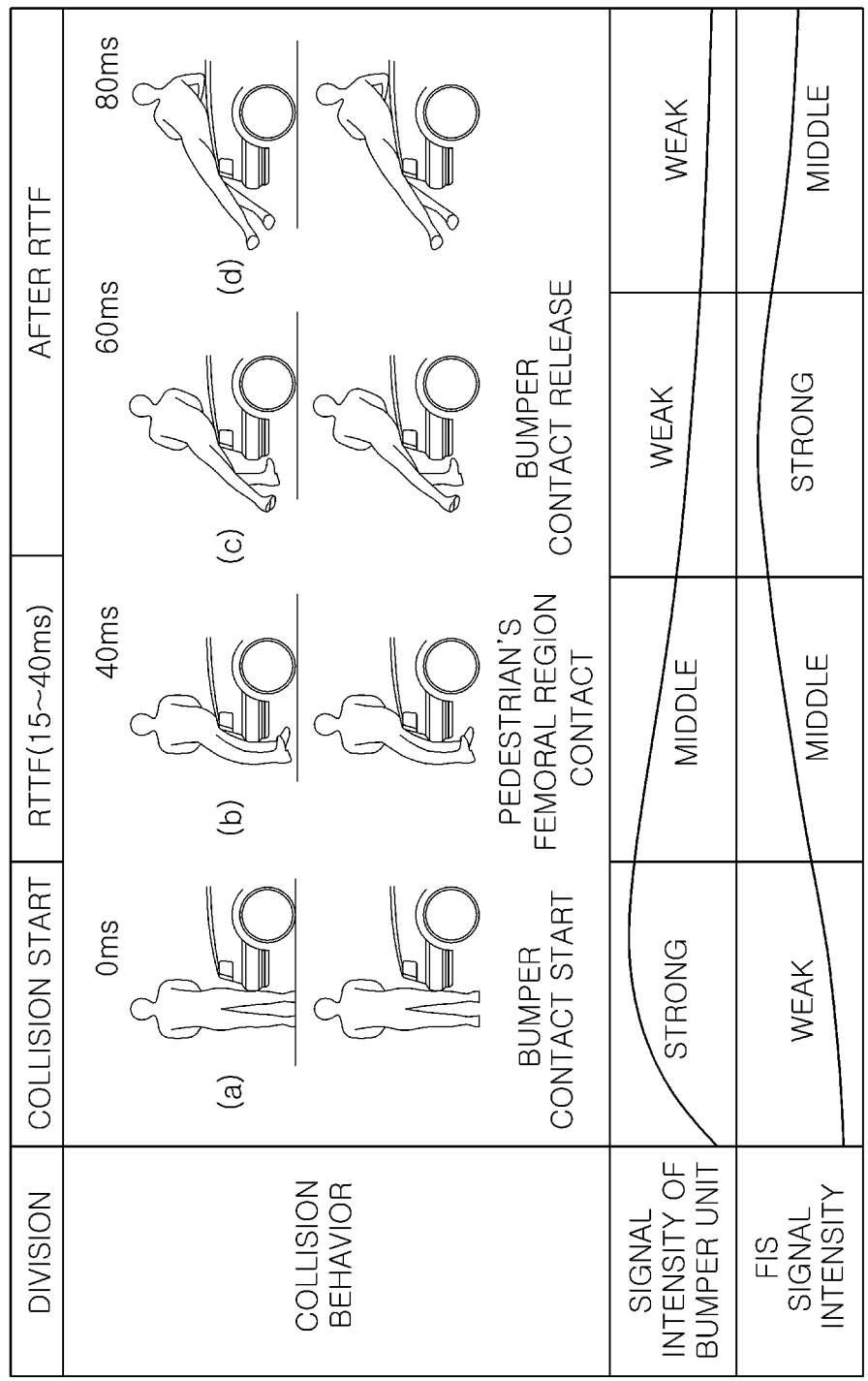
FIG. 6 is a diagram showing a behavior of a pedestrian over time when a vehicle collides with a pedestrian according to an embodiment.

FIG. 6 is a diagram showing a behavior of a pedestrian over time when a vehicle collides with a pedestrian according to an embodiment.

Further referring to FIG. 6, a large signal may be generated in the acceleration sensor 10 positioned in a bumper in a collision start step, but on the other hand, a strong signal may be generated in the impact sensor 30 positioned behind and above the acceleration sensor 10 after a required time to fire (or engage) (RTTF) at which a pedestrian moves above a vehicle hood.

Thus, when identifying an object using the acceleration metrics and the impact metrics, the determiner 60 may determine whether the object is a pedestrian through a behavior of the object that has collided with the vehicle.

According to another embodiment, the metrics setting unit 50 may set the accumulated signal value $(MS(|\Delta a_{HPF}|))$ and the double accumulated signal value)) $MS(MS(|\Delta a_{HPF}|))$ of a signal measured by the impact sensor 30 to the impact metrics. In particular, the double accumulated signal value $MS(MS(|\Delta a_{HPF}|))$ may be set to the X-axis metrics and the accumulated signal value $(MS(|\Delta a_{HPF}|))$ may be set to the Y-axis metrics.

The determiner 60 may derive a plot having the double accumulated signal value MS(MS(|Δa$_{HPF}$|)) on the X axis and the accumulated signal value (MS(|Δa$_{HPF}$|)) on the Y axis, and when the derived plot is not greater than the preset lowest range or is greater than the preset highest range, the determiner 60 may determine that the object that has collided with the vehicle is not a pedestrian.

Thus, the determiner 60 may be determine whether the object is a pedestrian using a behavior of the object that has collided with the vehicle using vibration generated in the impact sensor 30.

The impact sensors 30 may also be positioned at left and right sides of the vehicle, and may set the left metrics (LH+MID) and the right metrics (RH+MID) using acceleration measured by the impact sensors 30, respectively.

The vehicle collision determination system may further include the speed sensor 70 for measuring a driving speed of the vehicle or a rotation speed of a wheel, an impact reduction device 90 for reducing impact of a pedestrian that collides with the vehicle, and an operating unit 80 for setting a required time to fire (or engage) the impact reduction device 90 based on the driving speed of the vehicle or the rotation speed of the wheel, measured by the speed sensor 70, and operating the impact reduction device 90 when the time at which the detector 40 detects collision with the vehicle exceeds the set required time to engage.

The speed sensor 70 may indirectly use the driving speed of the vehicle by measuring the driving speed at which the vehicle travels or measuring the rotation speed of the wheel.

The operating unit 80 may set the required time to engage the impact reduction device 90, may not operate the impact reduction device 90 to the set required time to engage from the time at which collision of the vehicle is detected, and may operate the impact reduction device 90 when the required time to engage is exceeded.

That is, the determiner 60 may continuously determine whether the object is a pedestrian during the set required time to engage from the time at which the detector 40 detects collision of the vehicle, and the operating unit 80 may operate the impact reduction device 90 when the determiner 60 determines that the object is a pedestrian in the state in which the required time to engage is exceeded.

Here, the impact reduction device 90 may be a hood lift for popping up a vehicle hood upward, a pedestrian airbag that is deployed from a front glass or a hood of the vehicle to protect a pedestrian, or the like.

Figure 7:
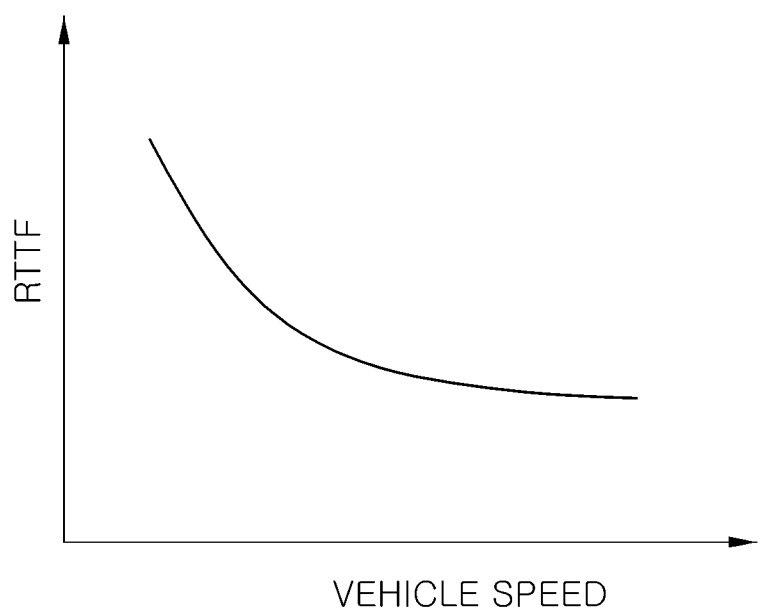
FIG. 7 is a diagram showing a required time to fire (or engage) according to an embodiment.

FIG. 7 is a diagram showing a required time to engage according to an embodiment.

The required time to engage may be set to be inversely proportional to a driving speed of a vehicle or a rotation speed of a wheel. That is, as the driving speed of the vehicle is increased, a behavior of a pedestrian that collides with the vehicle becomes fast, and thus the required time to engage may be reduced.

The required time to engage may be set in consideration of a time consumed to operate the impact reduction device 90 and may be set to a predetermined ratio of a time required to actually deploy the impact reduction device 90.

According to an embodiment, the metrics setting unit 50 may set the acceleration metrics using the acceleration measured by the acceleration sensor 10 and may set the impact metrics using the signal measured by the impact sensor 30, and the determiner 60 may determine that the object is a pedestrian when both results respectively determined using the acceleration metrics and the impact metrics correspond to a pedestrian and the object determined by simultaneously using the acceleration metrics and the impact metrics is a pedestrian.

The metrics setting unit 50 may set the accumulated acceleration value (MS(|Δa$_{HPF}$|)) and the double accumulated acceleration value MS(MS(|Δa$_{HPF}$|)) to the acceleration metrics, and the determiner 60 may determine whether the object is a pedestrian using the set acceleration metrics.

The metrics setting unit 50 may set the accumulated acceleration value (MS(|Δa$_{HPF}$|)) of the acceleration measured by the acceleration sensor 10 and the double accumulated signal value MS(MS(|Δa$_{HPF}$|)) of the signal measured by the impact sensor 30 to the acceleration metrics and the impact metrics, and the determiner 60 may determine whether the object is a pedestrian using the set acceleration metrics and the set impact metrics.

The metrics setting unit 50 may set the accumulated signal value (MS(|Δa$_{HPF}$|)) and the double accumulated signal value MS(MS(|Δa$_{HPF}$|)) of the signal measured by the impact sensor 30 to the impact metrics, and the determiner 60 may determine whether the object is a pedestrian using the set impact metrics.

The determiner 60 may determine that the object is a pedestrian when both results respectively determined using the acceleration metrics and the impact metrics correspond to a pedestrian and the object determined by simultaneously using the acceleration metrics and the impact metrics is a pedestrian (AND condition).

Figure 8:
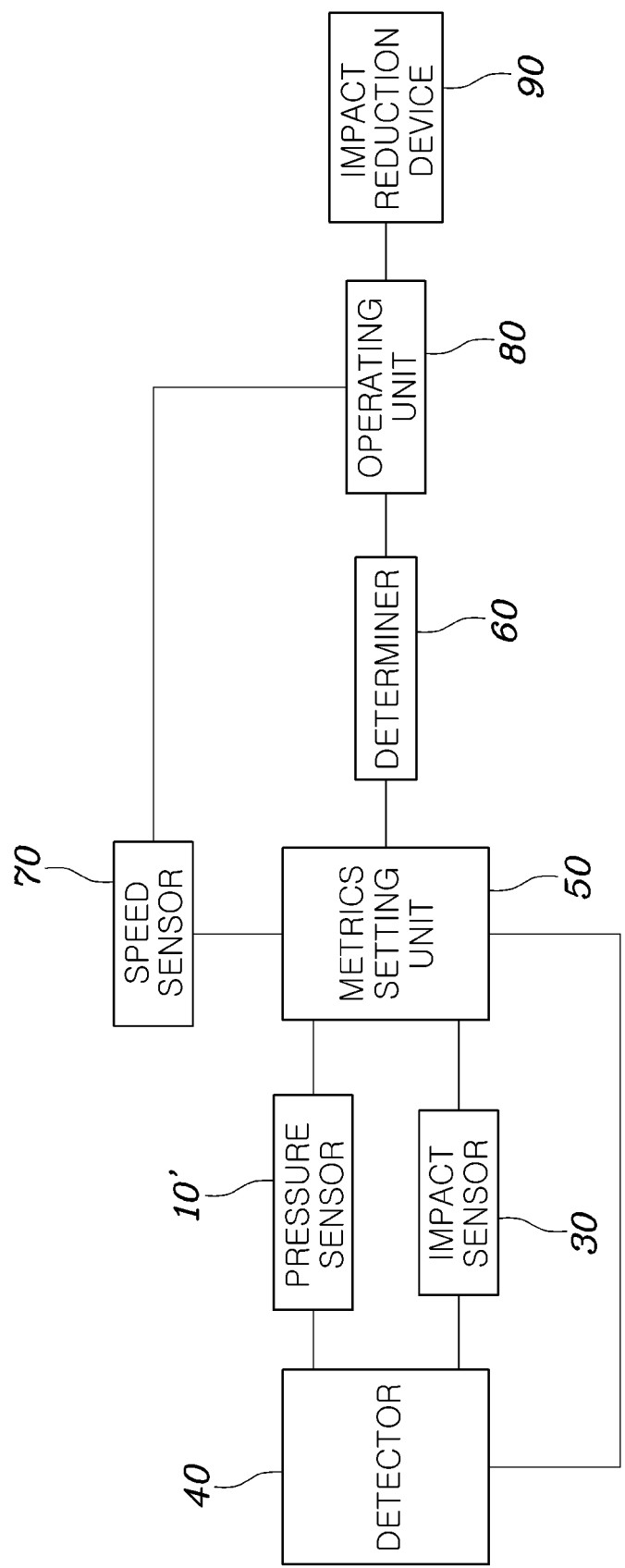
FIG. 8 is a diagram showing the configuration of a vehicle collision determination system according to another embodiment.
Figure 9:
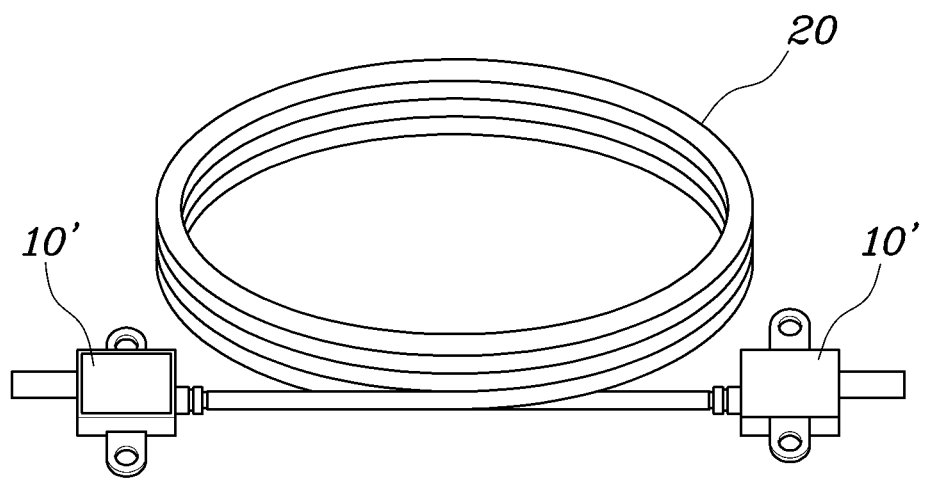
FIG. 9 shows a fluid pipe and a pressure sensor according to an embodiment.

FIG. 8 is a diagram showing the configuration of a vehicle collision determination system according to another embodiment. FIG. 9 shows a fluid pipe 20 and a pressure sensor 10' according to an embodiment.

Further referring to FIGS. 8 and 9, a collision determination system of a vehicle V according to another embodiment may include the pressure sensor 10' positioned at the front end of the vehicle V and for measuring external force applied to the front end of the vehicle V, the detector 40 for detecting whether the vehicle V collides using the external force measured by the pressure sensor 10', the metrics setting unit 50 for setting at least one metric using the external force measured by the pressure sensor 10' when the detector 40 detects collision of the vehicle V, and the determiner 60 for determining that the object that has collided with the vehicle V is a pedestrian using the metrics set by the metrics setting unit 50.

The pressure sensor 10' may be positioned at the front end of the vehicle V. According to an embodiment, the pressure sensor 10' may be positioned in a front bumper of the vehicle V.

A compressible fluid such as air or gas may be stored inside the fluid pipe 20, and the fluid pipe 20 may be sealed from the outside. The pressure sensor 10' may be positioned at each of left and right ends of the fluid pipe 20 and may sense a fluid pressure P inside the fluid pipe 20. In particular, the left and right end of the fluid pipe 20 may be sealed by the pressure sensor 10'.

The fluid pipe 20 or the pressure sensor 10' may be positioned inside the bumper of the vehicle V. The front bumper of the vehicle V may be positioned at the front side of the vehicle V. A bumper may be formed by a back beam, an impact absorber surrounding the back beam, and a cover surrounding the impact absorber, and the fluid pipe 20 may be positioned inside the impact absorber and may be fixed to the back beam.

The detector 40 may detect whether the vehicle V collides using the external force measured by the pressure sensor 10'. In particular, when the pressure P measured by the pressure sensor 10' is equal to or greater than a preset reference pressure, the detector 40 may detect that the vehicle V collides.

As described below, when impact measured by the impact sensor 30 is equal to or greater than a preset impact, the detector 40 may detect that the vehicle V collides.

In detail, when the acceleration magnitude |α| or the accumulated amount of acceleration magnitude MS(|α|) of the acceleration measured by the impact sensor 30 is equal to or greater than a preset value, the detector 40 may detect that the vehicle collides and may set metrics for identifying an object.

According to another embodiment, when any one of various sensors determines that the vehicle collides, the detector 40 may set metrics for identifying an object. Here, a threshold for detecting collision of the vehicle may be preset to different values depending on the type, position, or the like of the sensor.

When the pressure P measured by the pressure sensor 10' is equal to or greater than a preset reference pressure or the impact measured by the impact sensor 30 is equal to or greater than a preset impact, the detector 40 may detect that the vehicle V collides (OR condition).

When the pressure sensor 10' or the impact sensor 30 is configured in plural, if the pressure P or the impact measured by at least one sensor is equal to or greater than a preset reference pressure or a preset reference impact, the detector 40 may detect that the vehicle V collides.

When the detector 40 detects that the vehicle V collides, the metrics setting unit 50 may set metrics for identifying an object. In particular, the metrics setting unit 50 may set metrics using the external force measured by the pressure sensor 10'.

The determiner 60 may determine whether the object that collides with the vehicle V is a pedestrian using the metrics set by the metrics setting unit 50. According to an embodiment, whether the object that collides with the vehicle V is a pedestrian may be determined by determining whether the set metrics enter a preset range.

Further referring to FIG. 5, the metrics setting unit 50 may set the external force measured by the pressure sensor 10' and an accumulated value of external force obtained by accumulating the measured external force in a preset first number, to external force metrics.

In detail, the accumulated value of external force obtained by accumulating a fluid pressure inside the fluid pipe 20 measured by the pressure sensor 10' in a preset first number through moving sum calculation may be set to the external force metrics.

In addition, the fluid pressure P inside the fluid pipe 20, measured by the pressure sensor 10', may be set to the external force metrics without change.

In particular, the metrics setting unit 50 may apply a low pass filter for passing only a lower frequency signal than a preset second frequency to the external force P measured by the pressure sensor 10' and may set metrics using the external force $P_{LPF}$ to which the low pass filter is applied.

Here, the preset second frequency (cut off frequency) may be set to, for example, 90 Hz.

Thus, noise corresponding to a high-frequency region may be removed, and a change in a measured value of the pressure sensor 10', which occurs due to collision between the vehicle V and an object, may be accurately determined.

As shown in FIG. 5, according to an embodiment, the accumulated value $MS(P_{LPF})$ of the external force measured by the pressure sensor 10' may be set to X-axis metrics, and the external force $P_{LPF}$ may be set to Y-axis metrics.

When a change in the external force compared with the accumulated value $MS(P_{LPF})$ of external force is greater than a preset lowest range (FIRE THRESHOLD) based on the set external force metrics and is maintained less than a preset highest range (INHIBIT THRESHOLD), the determiner 60 may determine that the object that collides with the vehicle V is a pedestrian.

In particular, the determiner 60 may derive a plot having the accumulated value $MS(P_{LPF})$ of external force on the X axis and the external force $P_{LPF}$ on the Y axis, and when the derived plot is not greater than the preset lowest range (FIRE THRESHOLD) or is greater than the preset highest range (INHIBIT THRESHOLD), the determiner 60 may determine that the object that collides with the vehicle V is not a pedestrian.

In detail, the preset lowest range (FIRE THRESHOLD) may be set to a reference than which the plot needs to be greater even in an unfavorable condition when the vehicle V collides with a pedestrian, and the determiner 60 may determine that the object that collides with the vehicle V is a pedestrian when the plot is greater than the preset lowest range (FIRE THRESHOLD) at least in a partial section.

In addition, the preset highest range (INHIBIT THRESHOLD) may be set to a reference than which the plot is not capable of being greater when the vehicle V collides with a pedestrian, and the determiner 60 may determine that the object that collides with the vehicle is not a pedestrian when the plot is greater than the preset highest range (INHIBIT THRESHOLD) at least in a partial section, and the determiner 60 may determine that the object that collides with the vehicle is a pedestrian when the plot is maintained not to be greater than the preset highest range (INHIBIT THRESHOLD).

That is, whether the object that collides with the vehicle V is a pedestrian may be determined through a change in the pressure applied to the vehicle V by applying the external force metrics using the pressure sensor 10'.

The vehicle collision determination system may further include the impact sensor 30 positioned at the front end of the vehicle at rear and upper sides of the fluid pipe 20 and for measuring an impact externally applied to the vehicle V, and the metrics setting unit 50 may set the accumulated value $MS(P_{LPF})$ of external force obtained by accumulating the external force measured by the pressure sensor 10' in a preset first number to the external force metrics, and may set, to the impact metrics, the double accumulated acceleration value $MS(MS(|\Delta a_{HPF}|))$ obtained by re-accumulating the accumulated acceleration value $MS(|\Delta a_{HPF}|)$ which is obtained by accumulating the acceleration magnitude |α| of the acceleration measured by the impact sensor 30 or the acceleration variation magnitude |Δa| of the acceleration for a preset time in a preset second number, in a third number.

The impact sensor 30 may be a front impact sensor (FIS) fixed to a front end module (FEM) 31. The impact sensor 30 may be positioned above the fluid pipe 20 while being positioned behind and may be positioned above a radiator grill positioned at the front end of the vehicle V.

Here, the first number, the second number, and the third number may be appropriately set in consideration of a measurement cycle or a required time to fire (or engage) (RTTF) of a sensor and may be set to the same value.

That is, the impact sensor 30 may be positioned at an inward side based on the fluid pipe 20 or the pressure sensor 10' in the vehicle V. The impact sensor 30 may be an accelerometer sensor for measuring acceleration.

The impact metrics may be set to the double accumulated value obtained by doubly accumulating an acceleration variation magnitude for a preset time. In particular, the variation in acceleration may be calculated using an absolute value Here, the preset time may be a measurement cycle for measuring acceleration.

The metrics setting unit 50 may set, to the impact metrics, the double accumulated value $MS(MS(|\Delta a_{HPF}|))$ obtained by re-accumulating the accumulated acceleration value $MS(|\Delta a_{HPF}|)$, which is obtained by accumulating a variation in acceleration in a preset second number, in a third number.

The metrics setting unit 50 may apply a high pass filter for passing only a higher frequency signal than a preset first frequency to the acceleration measured by the impact sensor 30 and may set the impact metrics using the acceleration $a_{HPF}$ to which the high pass filter is applied. Here, the preset first frequency may be set to 300 Hz.

In addition, the metrics setting unit 50 may receive acceleration to which a filter itself of the impact sensor 30 is applied before the high pass filter is applied.

The metrics setting unit 50 may apply a scaling factor to the acceleration received by the impact sensor 30. The scaling factor may be generated based on a driving speed of the vehicle V or a rotation speed of a wheel W, received by the speed sensor 70 that will be described below.

As shown in FIG. 5, according to an embodiment, the double accumulated acceleration value $MS(MS(|\Delta a_{HPF}|))$ may be set to the X-axis metrics, and the accumulated value $MS(P_{LPF})$ of external force may be set to the Y-axis metrics.

When a change in the external force compared with the double accumulated acceleration value is greater than a preset lowest range (FIRE THRESHOLD) based on the set external force metrics and the impact metrics and is maintained less than a preset highest range (INHIBIT THRESHOLD), the determiner 60 may determine that the object that collides with the vehicle V is a pedestrian.

In particular, the determiner 60 may derive a plot having the double accumulated acceleration value on the X axis and the accumulated value of external force on the Y axis, and when the derived plot is not greater than the preset lowest range (FIRE THRESHOLD) or is greater than the preset highest range (INHIBIT THRESHOLD), the determiner 60 may determine that the object that collides with the vehicle V is not a pedestrian.

Further referring to FIG. 6, a large signal may be generated in the pressure sensor 10' positioned in a bumper in a collision start step, but on the other hand, a strong signal may be generated in the impact sensor 30 positioned behind and above the pressure sensor 10' after a required time to fire (or engage) (RTTF) at which a pedestrian moves above a hood of the vehicle V.

Thus, when identifying an object using the external force metrics and the impact metrics, the determiner 60 may determine whether the object is a pedestrian through a behavior of the object that collides with the vehicle.

According to another embodiment, the metrics setting unit 50 may set the accumulated acceleration value ($MS(|\Delta a_{HPF}|)$) and the double accumulated acceleration value $MS(MS(|\Delta a_{HPF}|))$ to the impact metrics. In particular, the double accumulated acceleration value may be set to the X-axis metrics and the accumulated acceleration value may be set to the Y-axis metrics.

The determiner 60 may derive a plot having the double accumulated acceleration value on the X axis and the accumulated acceleration value on the Y axis, and when the derived plot is not greater than the preset lowest range (FIRE THRESHOLD) or is greater than the preset highest range (INHIBIT THRESHOLD), the determiner 60 may determine that the object that collides with the vehicle is not a pedestrian.

Thus, the determiner 60 may be determine whether the object is a pedestrian using a behavior of the object that collides with the vehicle using vibration generated in the impact sensor 30.

Figure 10:
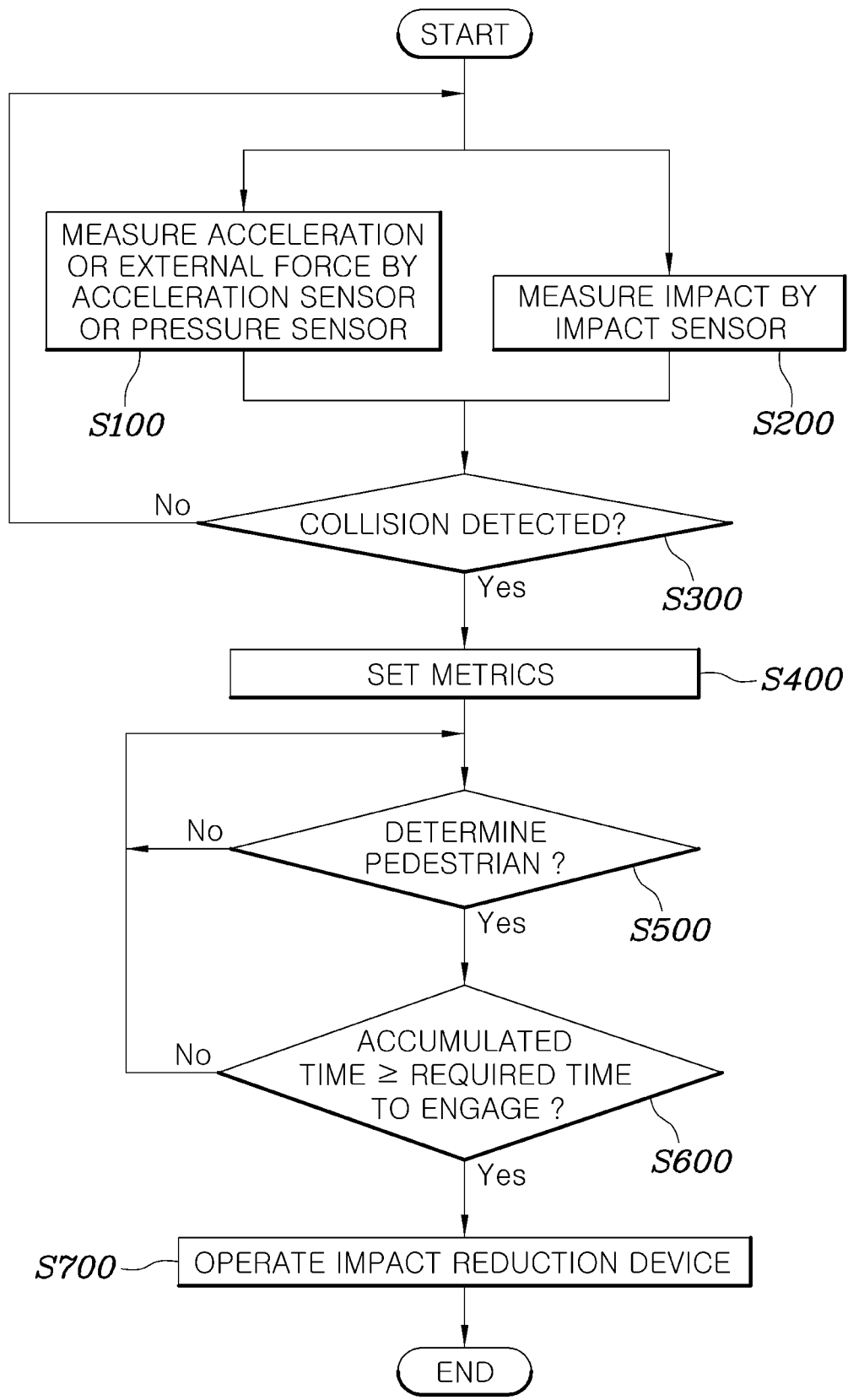
FIG. 10 is a flowchart showing a vehicle collision determination method according to an embodiment.

FIG. 10 is a flowchart showing a vehicle collision determination method according to an embodiment.

Further referring to FIG. 10, the collision determination method of the vehicle V according to an embodiment may include measuring acceleration at a fixed position by the acceleration sensor 10 positioned to a front end of a vehicle (S100), detecting whether the vehicle collides using the measured acceleration (S300), setting at least one metric using the measured acceleration when detecting collision (S400), and determining whether an object that has collided with the vehicle is a pedestrian using the set metrics (S500).

In the setting of the metrics (S400), an accumulated acceleration value obtained by accumulating an acceleration magnitude or an acceleration variation magnitude of the acceleration measured by the acceleration sensor 10 in a preset first number and a double accumulated acceleration value obtained by accumulating the accumulated acceleration value in a preset second number may be set to metrics.

In the determining whether the object is a pedestrian (S500), when the accumulated acceleration value change compared with the double accumulated acceleration value is greater than a preset lowest range based on the set metrics and is maintained less than a preset highest range, it may be determined that the object that has collided with the vehicle is a pedestrian.

The method may further include, prior to the setting of the metrics (S400), measuring an impact externally applied to the vehicle using the impact sensor 30 positioned at the front end of the vehicle at rear and upper sides of the acceleration sensor 10 (S200), and in the setting of the metrics (S400), the accumulated acceleration value obtained by accumulating the acceleration measured by the acceleration sensor 10 or a variation in the acceleration in a preset first number may be set to the acceleration metrics, and the double accumulated signal value obtained by re-accumulating an accumulated signal value, which is obtained by accumulating a signal measured by the impact sensor 30 or a variation in the signal for a preset time in a preset third number, in a preset fourth number, may be set to the impact metrics.

In the determining whether the object is a pedestrian (S500), when the accumulated acceleration value change compared with the double accumulated value of signals is greater than a preset lowest range based on the set acceleration metrics and the set impact metrics and is maintained less than a preset highest range, it may be determined that the object that collides with the vehicle is a pedestrian.

In the measuring of the acceleration (S100), acceleration at left, right, and central sides of the vehicle may each be measured, and in the setting of the metrics (S400), left metrics (LH+MID) may be set by summing the left acceleration and the central acceleration, right metrics (RH+MID) may be set by summing the right acceleration and the central acceleration, and summing metrics (LH+RH+MID) may be set by summing the left acceleration, the right acceleration, and the central acceleration, and in the determining whether the object is a pedestrian (S500), when the object determined using the summing metrics (LH+RH+MID) is a pedestrian and the object determined by at least one of the left metrics (LH+MID) and the right metrics (RH+MID) is a pedestrian, it may be determined that the object is a pedestrian.

The method may further include, prior to the setting of the metrics (S400), measuring an impact externally applied to the vehicle using the impact sensor 30 positioned at the front end of the vehicle at rear and upper sides of the acceleration sensor 10 (S200), and in the setting of the metrics (S400), the acceleration metrics may be set using the acceleration measured by the acceleration sensor 10 and the impact metrics may be set using the signal measured by the impact sensor 30, and in the determining whether the object is a pedestrian (S500), when both results respectively determined using the acceleration metrics and the impact metrics correspond to a pedestrian and the object determined by simultaneously using the acceleration metrics and the impact metrics is a pedestrian, it may be determined that the object is a pedestrian.

The method may further include, after the determining whether the object is a pedestrian (S500), setting a required time to engage the impact reduction device 90 based on the driving speed of the vehicle or the rotation speed of the wheel and operating the impact reduction device 90 (S700) when the time at which collision with the vehicle is detected exceeds the set required time to fire (or engage) (S600).

A collision determination method of the vehicle V according to another embodiment may include measuring external force applied to the front end of the vehicle V by the pressure sensor 10' positioned at the front end of the vehicle V (S100), detecting whether the vehicle V collides using the measured external force (S200), setting metrics using the measured external force when detecting collision (S400), and determining whether the object that has collided with the vehicle V is a pedestrian using the set metrics (S500).

In the setting of the metrics (S400), the external force measured by the pressure sensor 10' and the accumulated value of external force obtained by accumulating the measured external force in a preset number may be set to metrics.

In the determining whether the object is a pedestrian (S500), when a change in the external force compared with the accumulated value of external force is greater than the preset lowest range (FIRE THRESHOLD) based on the set metrics and is maintained less than the preset highest range (INHIBIT THRESHOLD), it may be determined that the object that collides with the vehicle V is a pedestrian.

The method may further include, prior to the setting of the metrics (S400), measuring an impact externally applied to the vehicle V using the impact sensor 30 positioned at the front end of the vehicle V at rear and upper sides of the pressure sensor 10' (S200), and in the setting of the metrics (S400), the accumulated value of external force obtained by accumulating the external force measured by the pressure sensor 10' in a preset first number may be set to external force metrics, and the double accumulated acceleration value obtained by re-accumulating the accumulated acceleration value, which is obtained by accumulating the acceleration measured by the impact sensor 30 or a variation in the acceleration for a preset time in a preset second number, in a preset third number, to the impact metrics.

In the determining whether the object is a pedestrian (S500), when a change in the accumulated value of external force compared with the double accumulated acceleration value is greater than the preset lowest range (FIRE THRESHOLD) based on the set external force metrics and the set impact metrics and is maintained less than a preset highest range (INHIBIT THRESHOLD), it may be determined that the object that collides with the vehicle V is a pedestrian.

In the measuring of the external force (S100), external force at a left side and a right force of the vehicle V may be measured, and in the setting of the metrics (S400), the left metrics (LH) may be set using the external force of the left side, the right metrics (RH) may be set using the external force of the right side, and the summing metrics (LH+RH) may be set using resultant force obtained by summing the external force of the left side and the external force of the right side, and in the determining whether the object is a pedestrian (S500), it may be determined that the object is a pedestrian when the object determined by the summing metrics (LH+RH) is a pedestrian and the object determined by at least one of the left metrics (LH) and the right metrics (RH) is a pedestrian.

The method may further include, prior to the setting of the metrics (S400), measuring ab impact externally applied to the vehicle V using the impact sensor 30 positioned at the front end of the vehicle V at rear and upper sides of the pressure sensor 10' (S200), and in the setting of the metrics (S400), the external force metrics may be set using the external force measured by the pressure sensor 10' and the impact metrics may be set using the impact measured by the impact sensor 30, and in the determining whether the object is a pedestrian, when both results respectively determined using the acceleration metrics and the impact metrics correspond to a pedestrian and the object determined by simultaneously using the external force metrics and the impact metrics is a pedestrian, it may be determined that the object is a pedestrian.

The method may further include, after the determining whether the object
is a pedestrian (S500), setting a required time to engage (or fire) (RTTF) of the impact reduction device 90 based on the driving speed of the vehicle V or the rotation speed of the wheel W and operating the impact reduction device 90 (S700) when the time at which collision with the vehicle V is detected exceeds the set required time to engage (or fire) (RTTF) (S600).

In a vehicle collision determination system and method according to the present disclosure, collision with a pedestrian may be determined in advance using an acceleration sensor positioned at a front side compared with a collision sensor.

In addition, a behavior of a pedestrian may be detected when collision occurs by simultaneously applying the acceleration sensor and the collision sensor that are positioned at different positions.

Although embodiments have been disclosed for illustrative purposes, those skilled in the art will appreciate that various modifications, additions and substitutions are possible, without departing from the of these embodiments as recited in the accompanying claims.

What is claimed is:
1. A vehicle collision determination system comprising:
   an acceleration sensor fixedly positioned on a front end of a vehicle and configured to measure acceleration at a fixed position;
   a detector configured to detect whether the vehicle has collided with an object using the acceleration measured by the acceleration sensor;
   a metrics setting unit configured to set at least one metric using the acceleration measured by the acceleration sensor when the detector detects collision of the vehicle;

a determiner configured to determine whether an object that has collided with the vehicle is a pedestrian using the at least one metric set by the metrics setting unit; and an impact sensor positioned at the front end of the vehicle at or adjacent to rear and upper sides of the acceleration sensor and configured to measure an impact externally applied to the vehicle, wherein the metrics setting unit sets, to acceleration metrics, an accumulated acceleration value obtained by accumulating an acceleration magnitude or an acceleration variation magnitude of acceleration measured by the acceleration sensor in a preset first number, and wherein the metrics setting unit sets, to impact metrics in a preset fourth number, a double accumulated signal value obtained by re-accumulating an accumulated signal value, which is obtained by accumulating a signal measured by the impact sensor or a variation in the signal for a preset time in a preset third number.

2. The vehicle collision determination system of claim 1, wherein the acceleration sensor is fixed to a bumper positioned at a front side of the vehicle.

3. The vehicle collision determination system of claim 1, wherein the metrics setting unit respectively sets, as first and second metrics, an accumulated acceleration value obtained by accumulating an acceleration magnitude or an acceleration variation magnitude of acceleration measured by the acceleration sensor in a preset first number and a double accumulated acceleration value obtained by accumulating an accumulated acceleration value in a preset second number; and wherein the determiner determines that the object that has collided with the vehicle is a pedestrian when an accumulated acceleration value change compared with the double accumulated acceleration value is greater than a preset lowest range based on the set first and second metrics and is maintained less than a preset highest range.

4. The vehicle collision determination system of claim 3, wherein the metrics setting unit applies a high pass filter for passing only a higher frequency signal than a preset first frequency to the acceleration measured by the acceleration sensor and sets the first and second metrics using the acceleration to which the high pass filter is applied.

5. The vehicle collision determination system of claim 1, wherein the acceleration sensor comprises a left sensor positioned at a left side of the vehicle, a right sensor positioned at a right side of the vehicle, and a central sensor positioned at a central region of the vehicle; and wherein the metrics setting unit sets left metrics by summing metrics set using acceleration measured by the left sensor and the central sensor, sets right metrics by summing metrics set using acceleration measured by the right sensor and the central sensor, and sets combined summing metrics by summing metrics set using acceleration measured by the left sensor, the right sensor, and the central sensor.

6. The vehicle collision determination system of claim 5, wherein the determiner determines that the object is a pedestrian when the object determined using the summing metrics is a pedestrian and the object determined by at least one of the left metrics and the right metrics is a pedestrian.

7. The vehicle collision determination system of claim 1, further comprising:

a speed sensor configured to measure a driving speed of the vehicle or a rotation speed of a wheel of the vehicle;

an impact reduction device configured to reduce impact of a pedestrian that collides with the vehicle; and an operating unit configured to set a required time to engage of the impact reduction device based on the driving speed of the vehicle or the rotation speed of the wheel, measured by the speed sensor, and to operate the impact reduction device when a time at which the detector detects collision with the vehicle exceeds the set required time to engage.

8. A vehicle collision determination system comprising:

a pressure sensor positioned at a front end of a vehicle and configured to measure an external force applied to the front end of the vehicle;

a detector configured to detect whether the vehicle has collided using the external force measured by the pressure sensor;

a metrics setting unit configured to set at least one metric using the external force measured by the pressure sensor when the detector detects collision of the vehicle;

a determiner configured to determine whether an object has collided with the vehicle is a pedestrian using the at least one metric set by the metrics setting unit; and a fluid pipe extending in a width direction of the vehicle and configured to store a fluid therein, wherein the pressure sensor is configured to sense a pressure of the fluid inside the fluid pipe.

9. The vehicle collision determination system of claim 8, wherein the metrics setting unit sets the external force measured by the pressure sensor and an accumulated value of external force obtained by accumulating the measured external force in a preset first number to external force metrics, and wherein the determiner determines that the object that has collided with the vehicle is a pedestrian when a change in the external force compared with the accumulated value of external force is greater than a preset lowest range based on the set external force metrics and is maintained less than a preset highest range.

10. The vehicle collision determination system of claim 9, wherein a low pass filter for passing only a lower frequency signal than a preset second frequency is applied to the external force measured by the pressure sensor, and external force metrics are set using the external force to which the low pass filter is applied.

11. The vehicle collision determination system of claim 8, further comprising:

an impact sensor positioned at the front end of the vehicle at rear and upper sides of the fluid pipe and configured to measure impact externally applied to the vehicle, wherein the metrics setting unit sets, to external force metrics, an accumulated value of external force obtained by accumulating the external force measured by the pressure sensor in a preset first number, and wherein the metrics setting unit sets, to impact metrics, a double accumulated acceleration value obtained by re-accumulating, in a preset third number, an accumulated acceleration value, which is obtained by accumulating an acceleration magnitude of acceleration measured by the impact sensor or an acceleration variation magnitude of the acceleration for a preset time in a preset second number.

12. The vehicle collision determination system of claim 11, wherein the metrics setting unit applies a high pass filter for passing only a higher frequency signal than a preset first frequency to the acceleration measured by the impact sensor and sets the impact metrics using the acceleration to which the high pass filter is applied.

13. The vehicle collision determination system of claim 8, further comprising:
a speed sensor configured to measure a driving speed of the vehicle or a rotation speed of a wheel of the vehicle;
an impact reduction device configured to reduce impact of a pedestrian that has collided with the vehicle; and
an operating unit configured to set a required time to engage the impact reduction device based on the driving speed of the vehicle or the rotation speed of the wheel, measured by the speed sensor, and to cause the impact reduction device to be engaged when the time at which the detector detects collision with the vehicle exceeds the set required time to engage.

14. The vehicle collision determination system of claim 8, wherein the pressure sensor comprises a plurality of pressure sensors that are positioned at a left side and a right side of the vehicle,
wherein the metrics setting unit sets left metrics using external force measured by a pressures sensor positioned at a left side, sets right metrics using external force measured by a pressure sensor positioned at a right side, and sets summing metrics using resultant force obtained by summing the external force measured by the left sensor positioned at the left side and the external force measured by the right sensor positioned at the right side, and
wherein the determiner determines that the object is a pedestrian when the object determined using the summing metrics is a pedestrian and the object determined by at least one of the left metrics and the right metrics is a pedestrian.

15. A vehicle collision determination method comprising:
measuring an acceleration at a fixed position or an external force applied to a front end of a vehicle by an acceleration sensor or a pressure sensor positioned at the front end of the vehicle;
detecting that the vehicle has collided with an object using the measured acceleration or external force;
measuring an impact externally applied to the vehicle using an impact sensor positioned at a front end of the vehicle at rear and upper sides of the acceleration sensor or the pressure sensor;
setting at least one metric using the measured acceleration or the external force; and
determining that an object that has collided with the vehicle is a pedestrian using the set at least one metric,
wherein the setting of the at least one metric comprises setting acceleration metrics using the acceleration measured by the acceleration sensor or setting external force metrics using the external force measured by the pressure sensor, and setting impact metrics using a signal measured by the impact sensor, and
wherein the determining that the object is a pedestrian comprises determining that the object is the pedestrian when both results respectively determined using the acceleration metrics or the external force metrics and the impact metrics correspond to a pedestrian and the object determined by simultaneously using the acceleration metrics or the external force metrics and the impact metrics is a pedestrian.

16. The vehicle collision determination method of claim 15, further comprising: after the determining that the object is a pedestrian, setting a required time to engage an impact reduction device based on a driving speed of the vehicle or a rotation speed of a wheel and operating the impact reduction device when a time at which collision of the vehicle is detected exceeds the set required time to engage.

17. The vehicle collision determination method of claim 15, wherein the acceleration sensor is positioned on a bumper at a front side of the vehicle.

* * * * *